(12) United States Patent
Boffeli et al.

(10) Patent No.: US 12,521,156 B2
(45) Date of Patent: Jan. 13, 2026

(54) MODULAR DIGIT FIXATION DEVICE AND RELATED SYSTEMS AND METHODS

(71) Applicant: Surgical Design Innovations II, LLC, Johnston, IA (US)

(72) Inventors: Troy J. Boffeli, Woodbury, MN (US); Shannon M. Rush, San Jose, CA (US); Michael Lee, Johnston, IA (US); Jordan Grossman, Akron, OH (US); Graham Hamilton, Concord, CA (US)

(73) Assignee: Surgical Design Innovations II, LLC, Johnston, IA (US)

( * ) Notice: Subject to any disclaimer, the term of this patent is extended or adjusted under 35 U.S.C. 154(b) by 998 days.

(21) Appl. No.: 17/637,117

(22) PCT Filed: Aug. 27, 2020

(86) PCT No.: PCT/US2020/048145
§ 371 (c)(1),
(2) Date: Feb. 22, 2022

(87) PCT Pub. No.: WO2021/041634
PCT Pub. Date: Mar. 4, 2021

(65) Prior Publication Data
US 2022/0280212 A1  Sep. 8, 2022

Related U.S. Application Data

(60) Provisional application No. 62/892,222, filed on Aug. 27, 2019.

(51) Int. Cl.
*A61B 17/80* (2006.01)

(52) U.S. Cl.
CPC ...... *A61B 17/8061* (2013.01); *A61B 17/8023* (2013.01)

(58) Field of Classification Search
CPC . A61B 17/80; A61B 17/8023; A61B 17/8061; A61B 17/64; A61B 17/6458; A61B 17/6466; A61B 17/6483
See application file for complete search history.

(56) References Cited

U.S. PATENT DOCUMENTS

| | | | |
|---|---|---|---|
| 4,604,997 | A | 8/1986 | De Bastiani et al. |
| 5,304,177 | A | 4/1994 | Pennig |
| 5,391,167 | A | 2/1995 | Pong et al. |
| 5,658,283 | A | 8/1997 | Huebner |
| 9,730,825 | B2 | 8/2017 | Cempini et al. |
| 9,962,188 | B2 | 5/2018 | Milella, Jr. et al. |

(Continued)

FOREIGN PATENT DOCUMENTS

| | | |
|---|---|---|
| CN | 106859749 | 6/2017 |
| JP | 3204228 | 5/2016 |
| WO | 2013005130 A9 | 1/2013 |

*Primary Examiner* — Si Ming Ku
(74) *Attorney, Agent, or Firm* — Fredrikson & Byron, P.A.

(57) ABSTRACT

Disclosed herein are various embodiments of a modular digit fixation system that has two or more attachable and adjustable modules. The modules are attachable to separate adjacent digits and each other and have multiplanar adjustability. Two modules are disclosed: an elongate module and a cylindrical module having a body and a slidable clamp. Further, the embodiments also include various related components, devices, methods, and technologies.

18 Claims, 5 Drawing Sheets

(56) References Cited

U.S. PATENT DOCUMENTS

| | | |
|---|---|---|
| 10,166,054 B2 | 1/2019 | Woodburn, Sr. et al. |
| 2002/0147452 A1 | 10/2002 | Medoff et al. |
| 2005/0085754 A1 | 4/2005 | Werding et al. |
| 2014/0081269 A1* | 3/2014 | Biedermann .......... A61B 17/80 606/71 |
| 2014/0135766 A1 | 5/2014 | Mingozzi et al. |
| 2015/0112446 A1 | 4/2015 | Melamed et al. |
| 2018/0049786 A1 | 2/2018 | Brace et al. |
| 2018/0161067 A1 | 6/2018 | Dayton |
| 2018/0317966 A1 | 11/2018 | Riccione |
| 2019/0183531 A1 | 6/2019 | Miller |
| 2020/0069334 A1 | 3/2020 | Moradi et al. |

* cited by examiner

MODULAR DIGIT FIXATION DEVICE AND RELATED SYSTEMS AND METHODS

CROSS-REFERENCE TO RELATED APPLICATION(S)

This application claims priority to International PCT Application No. PCT/US20/48145, filed on Aug. 27, 2020, which claims the benefit under 35 U.S.C. § 119(e) to U.S. Provisional Application 62/892,222, filed Aug. 27, 2019 and entitled "Modular Digit Fixation Device and Related Systems and Devices," which is hereby incorporated herein by reference in its entirety.

FIELD

The various embodiments herein relate to bone fixation devices, and more specifically to modular digit fixation devices to be affixed externally to digits after reconstructive, realignment, or trauma surgery.

BACKGROUND

Internal and external fixation can be an important phase of healing after bone surgery. For example, the best outcomes after hammertoe or bunion surgery occur as a result of fixation of the toe bones to assure proper alignment of those bones during healing. In known procedures, surgeons manually place each toe in the proper position, but typically rely on bandages to maintain the alignment during the initial weeks of healing. One disadvantage of such procedures is that they often lead to recurrent toe deformities and therefore undesirable results.

An alternative approach is to drive a pin thru the toe bones (phalanges) and into the foot bones (metatarsals). This approach works for a few toes but is rarely performed for more than the central 3 toes and is more invasive, requires added protection during healing, and is prone to pin breakage. Hammertoe and bunion surgery is a further approach commonly performed on multiple toes during one operative setting with the goal of long term multiplanar alignment of one toe to another. These traditional approaches are often insufficient at both short and long term digital alignment.

There is a need in the art for improved digit fixation methods, systems, and devices to maintain proper digit alignment post-operatively.

BRIEF SUMMARY

Discussed herein are various embodiments of a modular digit fixation device, including a device having at least one elongate module, a cylindrical module, and other related devices, methods, and technologies.

In Example 1, a modular digit fixation system comprises at least one first digit fixation module comprising a modular body and a clamp slidably coupled to the flange. The modular body comprises a flange and a first cylinder comprising a first lumen defined therein. The system further comprises a second digit fixation module comprising a second cylinder comprising a second lumen defined therein.

Example 2 relates to the modular digit fixation system according to Example 1, wherein the clamp is attachable to the second cylinder.

Example 3 relates to the modular digit fixation system according to Example 1, wherein the flange comprises a channel defined therein, wherein the clamp is slidable along the channel.

Example 4 relates to the modular digit fixation system according to Example 1, further comprising at least two fixation rods, wherein a first of the at least two fixation rods is disposable within the first lumen and a second of the at least two fixation rods is disposable within the second lumen.

Example 5 relates to the modular digit fixation system according to Example 4, wherein each of the at least two fixation rods comprises a first length and a second length having an axis disposed at an angle ranging from about 90 degrees to about 180 degrees in relation to an axis of the first length, wherein the first length and a second length are attached at a joint.

Example 6 relates to the modular digit fixation system according to Example 5, wherein the first length is implantable into a digit bone of the patient.

Example 7 relates to the modular digit fixation system according to Example 1, further comprising a first coupling mechanism operably coupled to the first cylinder, a first attachment mechanism operably coupled to the clamp, and a second coupling mechanism operably coupled to the second cylinder.

In Example 8, a modular digit fixation system comprises at least two intramedullary fixation rods, wherein each of the at least two intramedullary rods is implantable into an elongate bone of a patient, and at least one first digit fixation module comprising a modular body and a clamp. The modular body comprises a flange and a first cylinder comprising a first lumen defined therein, wherein a first of the at least two intramedullary fixation rods is positionable within the first lumen. The clamp is slidably coupled to the flange such that the clamp is slidable along a length of the flange, and the clamp comprises a first clamp arm, a second clamp arm, and a clamp lumen defined by the first and second clamp arms. The system further comprises a second digit fixation module comprising a second cylinder comprising a second lumen defined therein, wherein a second of the at least two intramedullary fixation rods is positionable within the second lumen.

Example 9 relates to the modular digit fixation system according to Example 8, wherein the first cylinder is adjustably positionable along a length of the first of the at least two intramedullary fixation rods and the second cylinder is adjustably positionable along a length of the second of the at least two intramedullary fixation rods.

Example 10 relates to the modular digit fixation system according to Example 9, wherein the first and second cylinders are adjustably positionable along a sagittal plane of the patient.

Example 11 relates to the modular digit fixation system according to Example 8, wherein the clamp is attachable to the second cylinder such that a distance between the first cylinder and the second cylinder is adjustable along a transverse plane of the patient.

Example 12 relates to the modular digit fixation system according to Example 11, wherein the second cylinder is positionable within the clamp lumen such that the clamp is attachable to the second cylinder.

Example 13 relates to the modular digit fixation system according to Example 8, wherein the flange comprises a channel defined therein, wherein the clamp is slidable along the channel.

Example 14 relates to the modular digit fixation system according to Example 8, wherein each of the at least two fixation rods comprises a first length, and a second length having an axis disposed at an angle ranging from about 90 degrees to about 180 degrees in relation to an axis of the first length, wherein the first length and a second length are attached at a joint.

Example 15 relates to the modular digit fixation system according to Example 14, wherein the first length is implantable into a digit bone of the patient, and wherein the first cylinder is adjustably positionable along the second length of the first of the at least two intramedullary fixation rods and the second cylinder is adjustably positionable along the second length of the second of the at least two intramedullary fixation rods.

Example 16 relates to the modular digit fixation system according to Example 8, further comprising a first coupling mechanism operably coupled to the first cylinder, a first attachment mechanism operably coupled to the clamp, and a second coupling mechanism operably coupled to the second cylinder.

In Example 17, a method for fixation of at least two digits comprises implanting a first intramedullary fixation rod into a first digit bone, implanting a second intramedullary fixation rod into a second digit bone, and positioning a first digit fixation module over the first intramedullary fixation rod. The first digit fixation module comprises a modular body and a clamp. The modular body comprises a flange and a first cylinder comprising a first lumen defined therein. The clamp is slidably coupled to the flange such that the clamp is slidable along a length of the flange and comprises a first clamp arm, a second clamp arm, and a clamp lumen defined by the first and second clamp arms, wherein the positioning of the first digit fixation module over the first intramedullary fixation comprises positioning the first intramedullary fixation rod in the first lumen. The method further comprises positioning a second digit fixation module over the second intramedullary fixation rod, the second digit fixation module comprising a second cylinder comprising a second lumen defined therein, wherein the positioning of the second digit fixation module over the second intramedullary fixation comprises positioning the second intramedullary fixation rod in the second lumen, and attaching the first digit fixation module to the second digit fixation module via the clamp.

Example 18 relates to the method according to Example 17, wherein the attaching the first digit fixation module to the second digit fixation module via the clamp comprising positioning the second cylinder within the clamp lumen.

Example 19 relates to the method according to Example 17, further comprising adjusting a position of the first and second digit fixation modules along a sagittal plane of the patient by adjusting the position of the first and second digit fixation modules along a length of the first and second intramedullary fixation rods.

Example 20 relates to the method according to Example 17, further comprising adjusting a distance between the first and second cylinders along a transverse plane of the patient by adjusting the position of the clamp along the length of the flange.

Certain additional examples include a digit fixation device comprised of at least one elongate module and a cylindrical module. Both the elongate and cylindrical modules are comprised of a cylinder defining an internal lumen, designed to receive a k-wire that is protruding from the digit. A set screw is used to affix the cylinder to the k-wire at a desired height and angle to ensure proper alignment. The elongate module is further comprised of a flange and a clamp. The flange is fixedly attached to the cylinder and slidably attached to the clamp. The clamp is designed such that it may slide about the flange to enable variability in the distance between the modules. The clamp is also designed to pair with the cylinder of the neighboring module, and is secured with a set screw.

While one embodiment is disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The various embodiments disclosed or contemplated herein relate to improved systems, devices, and methods, and various components thereof, for external, multiplanar joint fixation. Such systems, devices, and methods can be used with or performed on any digits of a patient's extremities, including two or more fingers of a patient's hand and/or two or more toes of a patient's foot. More specifically, the implementations relate to a modular fixation device and related systems and methods designed to allow for multiplanar adjustments. Further, certain embodiments relate specifically to a modular digit fixation system having at least two modules, including at least one elongate module and a cylindrical module. Each of the modules are attachable to a longitudinal intramedullary rod and to each other such that the modules form an adjustable external device that is attached to two or more intramedullary rods implanted into the digit bones of the patient. That is, the rods are implanted into the bones, while the modules adjustably couple to the rods and each other to form an external device or system at a position external to the patient's digits such that the system captures each intramedullary rod for each digit and thereby provides stable and accurate fixated alignment of the digits. In certain exemplary implementations, up to four elongate modules and one cylindrical module may be used such that up to five digits are fixed with relation to one another, with multiplanar adjustability, to facilitate proper healing and alignment of the digits post-surgery.

Figure 1:
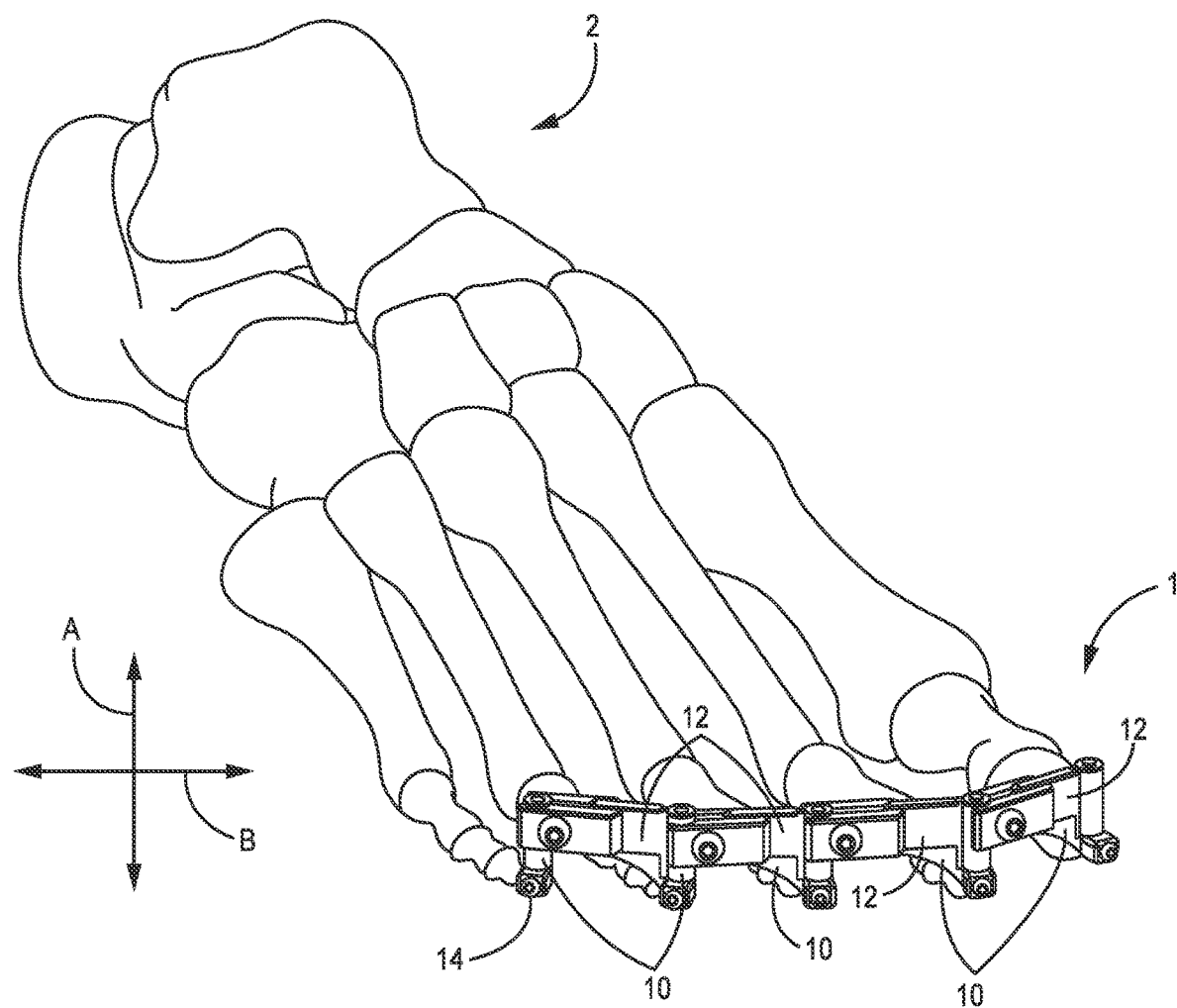
FIG. 1 is a perspective front view of a modular digit fixation system attached to a patient's toes, according to one embodiment.

FIG. 1 depicts a modular digit fixation device (or system) 1 in use on the right foot 2 of a patient, according to one embodiment. In this exemplary implementation, the device 1 includes five digit fixation modules 10, with each module 10 attached to a different one of the patient's five digits. Alternatively, fewer modules 10 may be used depending on the number of digits requiring alignment. In the specific example shown, four modules 10 are more specifically elongate digit fixation modules 12 and while the other module 10 is a cylindrical digit fixation module 14.

Figure 4A:
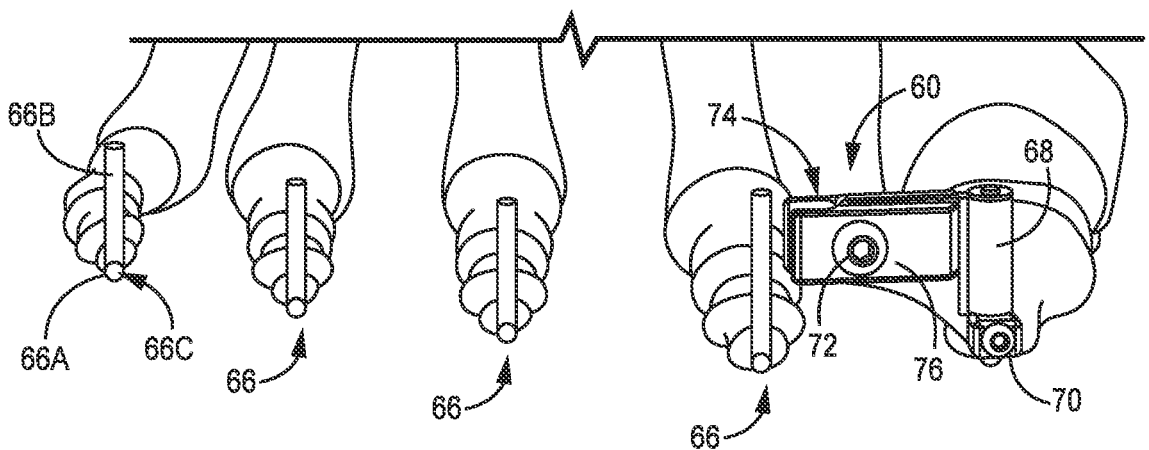
FIG. 4A is a front perspective view of rods implanted in a patient's toes and an elongate module disposed on one of the rods, according to one embodiment.
Figure 4B:
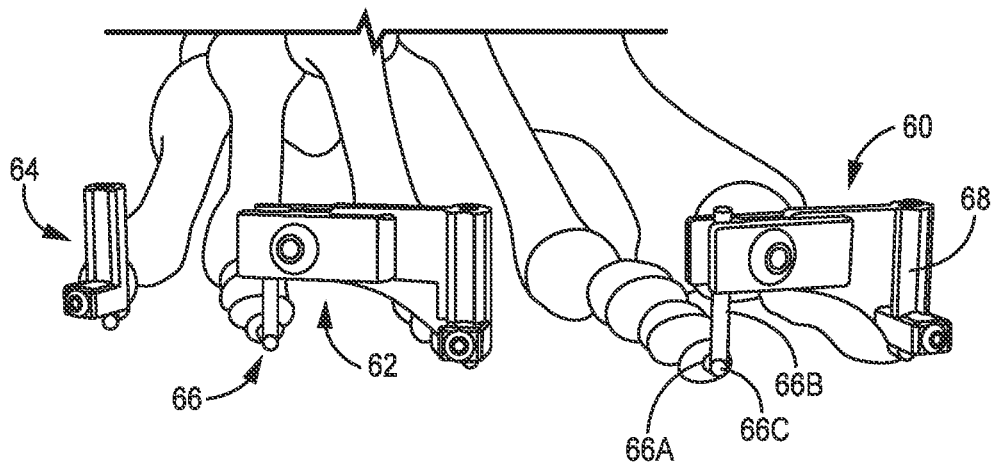
FIG. 4B is a front perspective view of the system of FIG. 4A in which two additional modules have been disposed on two additional rods, according to one embodiment.

As will be discussed in further detail below, each module 10 can be removably and adjustably coupled to a digit via a rod (such as rod 66 as depicted in FIGS. 4A and 4B, for example) that is disposed within the bone of the digit and extends from the distal end thereof. That is, each module 10 can be adjustably positioned anywhere along the length of the portion of the rod (such as rod 66) that is transverse to the longitudinal axis of the toe bone (that is, the portion of the rod disposed in the sagittal plane as identified by arrow A). As will also be discussed in further detail below, each module 10 is also adjustably coupled to adjacent modules 10 such that each module 10 can be adjustably attached thereto in a fashion that allows for movement and adjustment of the modules 10 in the transverse plane as identified by arrow B. As such, the multiplanar adjustability of this system of coupleable modules (as described in additional detail below) is achieved via the adjustability of the modules 10 on the rods 66 in the sagittal plane of arrow A and the adjustability of the coupling of the modules 10 to each other in the transverse plane of arrow B.

Figure 2:
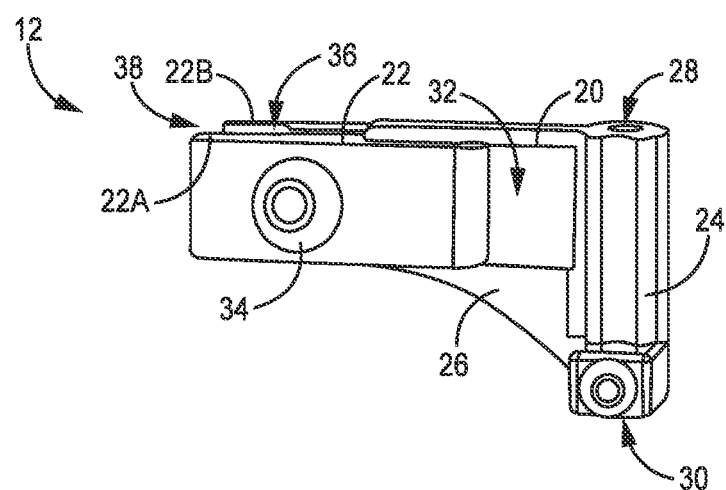
FIG. 2 is a perspective view of an elongate module, according to one embodiment.
Figure 3:
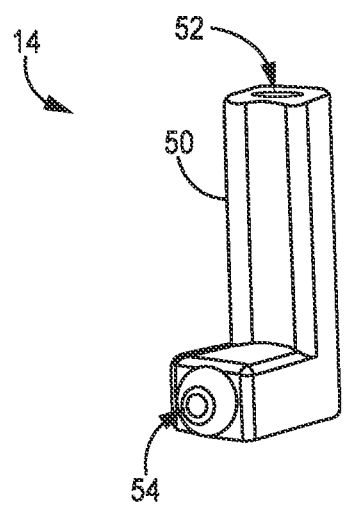
FIG. 3 is a perspective view of a cylindrical module, according to one embodiment.

The two separate modules 12, 14 that can be incorporated into the various device 1 configurations herein are shown in FIGS. 2 and 3. More specifically, FIG. 2 depicts one embodiment of the elongate digit fixation module 12 in further detail. As shown, this exemplary elongate digit fixation module 12 has two components that are moveably coupled to each other: a module body 20 and a slidable clamp 22 slidably coupled thereto. The elongate module 12 is also referred to herein as a "first module" or "medial module" because it is typically disposed medially of the cylindrical module 14 on the patient's foot as will be described in additional detail below.

The module body 20 has a cylindrical component (also referred to herein as a "cylinder") 24 and a flange (also referred to as a "projection") 26 extending from the cylindrical component 24. It is understood that the cylinder 24 does not have a complete cylindrical shape, because the flange 26 extends therefrom. In one embodiment, the body 20 (including the cylinder 24 and flange 26) 26 is one integral piece. Alternatively, the cylinder 24 and flange 26 can be separate pieces that are fixedly coupled together. The cylinder 24 has a lumen 28 defined therein such that a rod (such as a rod 66 as shown in FIGS. 4A and 4B, for example) can be disposed within the lumen 28, or, more accurately, so that the body 20 can be disposed over/on the rod 66 via the lumen 28.

The module body 20 also has a coupling mechanism 30 associated with the cylinder 24 as shown. More specifically, in this particular embodiment, the coupling mechanism 30 is a set screw 30 that is positionable through a threaded opening (not shown) in the side of the cylinder 24. As described in additional detail below, the coupling mechanism 30 can be used to removably or adjustably attach the module 12 to a rod (such as rod 66 as shown in FIGS. 4A and 4B, for example).

In addition, the body 20 has a channel 32 defined in the side of the flange 26 as shown. Further, the body 20 also has a matching channel (not shown) defined in the opposing side of the flange 26. The channel 32 (and the opposing channel on the opposing side of the flange 26) is configured to receive the clamp 22 such that the clamp 22 slides along the channel 32. As such, the clamp 22 can slide back and forth along an axis that is parallel to the length of the flange 26 and substantially transverse to the longitudinal axis of the cylinder 24. Alternatively, the channel 32 (and opposing channel that isn't shown) can be any known feature or mechanism that can receive the clamp 22 such that the clamp 22 can slide in relation to the body 20 as described herein.

The slidable clamp 22 can be any known slidable securement component that can be slidably coupled to the body 20. In this specific implementation, the slidable clamp 22 has a front clamp component 22A and a back clamp component 22B, wherein the front and back clamps 22A and 22B are operably coupled to each other via an attachment mechanism 34. In the exemplary embodiment as shown, the attachment mechanism 34 is a set screw 34. Alternatively, any known adjustable attachment mechanism 34 can be incorporated for use with the slidable clamp 22. The clamp 22 is slidably coupled at a first end to the channel 32 on the flange 26, as mentioned above. At the second end, the clamp 22 has a lumen 36 defined therein (or more specifically in the exemplary embodiment depicted, the two clamp halves or pieces 22A, 22B define a lumen 36 therebetween). Further, the clamp 22 has a slot 38 defined along its second end such that the slot 38 is in fluidic communication with the lumen 36. The lumen 36 is sized to receive the cylinder of a neighboring module (such as the cylinder 24 of module 12) such that the cylinder 24 can be inserted into the lumen 36 via the slot 38. Thus, the clamp 22 is adjustable at the first end with respect to the flange 26 and at the second end with respect to the neighboring module cylinder (such as cylinder 24, for example) such that once the clamp 22 is properly positioned with respect to both the flange 26 and the neighboring cylinder 24, the clamp 22 can be secured with the attachment mechanism 34 by urging the two clamp components 22A, 22B toward each other, as will be described in additional detail below.

FIG. 3 depicts the cylindrical digit fixation module 14 in further detail, according to one embodiment. The cylindrical digit fixation module 14 is substantially a cylindrical body (also referred to herein as a "cylinder") 50 having a lumen 52 defined therethrough. As with the elongate module 12 discussed above, the lumen 28 is configured such that it can receive a rod (such as a rod 66 as shown in FIGS. 4A and 4B, for example). Further, the body 50 also has a coupling mechanism 54 associated with the cylinder 50 as shown. More specifically, in this particular embodiment, the coupling mechanism 54 is a set screw 54 that is positionable through a threaded opening (not shown) in the side of the cylinder 50. As described in additional detail below (and in similar fashion to the module 12), the coupling mechanism 54 can be used to removably or adjustably attach the module 14 to a rod (such as rod 66 as shown in FIGS. 4A and 4B, for example). The cylindrical module 14 is also referred to herein as a "second module" or "lateral module" because it is typically disposed laterally of the elongate modules 14 on the patient's foot as will be described in additional detail below.

In use, according to one embodiment as best shown in FIGS. 4A and 4B, each separate module (such as separate modules 60, 62, 64) is attached to the separate digits of the patient and coupled together to create a fixation device such as device 1 as shown in FIG. 1 or device 80 as shown in FIGS. 5A-5D. More specifically, a rod (such as rod 66 as shown in FIGS. 4A and 4B) is first implanted into each digit and then a module (such as modules 60, 62, 64) is attached to each rod 66.

The rod 66 can be a k-wire 66 or any other known rod-like or wire-like component for use in bone fixation devices. In this implementation, each rod 66 is implanted into a digit to internally fixate the bone and soft tissue of each target toe following any digit or metatarsal/carpal procedures. Such known procedures can include, but are not limited to, joint arthroplasty, joint fusion, tenotomy, capsulotomy, osteotomy, reduction of fracture or dislocation, tendon repair or transfer, and the like. Upon implantation, the rod 66 protrudes from the tip of each such toe as shown in FIGS. 4A and 4B. As shown, the rod 66 has two portions 66A, 66B with a joint 66C therebetween such that the longitudinal axis of the first portion (or "implanted portion") 66A of the rod 66 is transverse to the longitudinal axis of the second portion (or "module attachment portion") 66B of the rod 66 at an angle that is substantially 90 degrees. As such, the first portion 66A is disposed within the patient's toe as described above such that the first portion 66A is disposed substantially parallel to and concentric with the longitudinal axis of the toe, with the joint 66C disposed just distal of the toe as shown. The second portion 66B of each rod 66 extends from the joint 66C at, according to one embodiment, a substantially 90-degree angle in relation to the first portion 66A (and in relation to the toe) such that a digit fixation module (such as modules 60, 62, 64) can be coupled thereto as described in additional detail below. Alternatively, the second portion 66B is disposed at an angle in relation to the first portion 66A that ranges from about 90 degrees to about 180 degrees, so long as the second portion 66B of each of the two or more rods 66 is disposed at substantially the same angle.

Once the rods 66 have been implanted and disposed as desired, the modules (such as modules 60, 62, 64) can then be coupled to the rods 66. More specifically, the cylinder 68 of the module 60 is positioned over the rod 66 implanted in the big toe such that the rod 66 is disposed within the lumen (not shown) of the cylinder 68. Similarly, the modules 62 and 64 can also be disposed over the respective rods 66 as shown. Once all of the modules (including modules 60, 62, 64) have been attached to the rods 66 as desired and coupled to each other as described above, the adjustment mechanisms (such as mechanisms 70, 72 on module 60, for example) can be used to adjust the positions of the modules along both planes as described elsewhere herein and then fixedly (but removably) attach the modules as desired.

More specifically, with respect to module 60 (but equally applicable to module 62), the module 60 can be disposed as desired on the rod 60. More specifically, the module 60 can be moved along the rod 60 (either "up" or "down" along the rod 60 in the direction represented by arrow A in FIG. 1) until the module 60 has been positioned as desired. At that point, the adjustment mechanism 70 can be utilized to fixedly attach the module 60 to the rod 60. In addition, once another module (not shown) has been disposed on the rod 60 next to the module 60, the module 60 can be positioned as desired in relation to that second module and then be attached thereto. More specifically, the cylinder of that module (not shown) is positioned in the lumen 74 of module 60 and the clamp 76 is adjusted as described above to set the distance between the cylinder 68 of the module 60 and the cylinder of the second module in the direction represented by arrow B in FIG. 1 (thereby establishing the desired distance between the two toes). Once the cylinder of the second module is disposed in the lumen 74 as desired and the clamp 76 is positioned as desired, the adjustment mechanism 72 can be utilized to fixedly attach the module 60 to the second module (not shown) and to fixedly attach the clamp 76 thereon, thereby fixing the module 60 as desired. This process is repeated with every module (including module 62, for example) until all the modules of the device are positioned and attached as desired. If any module needs to be adjusted, the adjustment mechanisms can be utilized to loosen and reattach such module as desired. As such, the entire fixation device (such as device 1 or device 80, for example) can be adjusted after it is assembled. It is understood that this multiplanar adjustability allows for multiplanar positioning of the digits in relation to each other, thereby ensuring the desired positioning of those digits via adjustment and then fixation.

In accordance with one implementation, to assemble a modular digit fixation device (such as device 1 or device 80, for example), the surgeon begins with the most medial toe and works laterally. Therefore, this process can begin on the first toe of the foot, as shown in FIG. 4A, but that is not always necessary. In certain embodiments, it is common that fewer than five toes require alignment, and often surgeons only align the middle three toes. In those cases, instead of starting to assemble the modular digit fixation device (such as device 1 or 80) on the first toe, this process will start on the second toe or any other toe except for the fifth toe. According to an alternative implementation, the modular digit fixation devices can be attached in the reverse direction (laterally to medially), such that the first module (the cylindrical module) is attached to the fifth toe, and then the additional modules having a cylinder and a flange are attached sequentially to the fourth toe, the third toe, etc.

To assemble certain modular digit fixation devices (including device 1 or device 80, for example), working medially to laterally, the surgeon will place the first elongate (or medial) digit fixation module on the most medial toe (such as module 60). The additional elongate digit fixation modules (such as modules 62, 64) are then placed until the most lateral toe, on which a cylindrical digit fixation module (such as module 64) is placed. After digit fixation modules (such as 60, 62, 64) have been placed on every toe requiring alignment, the digit fixation modules are set and secured in their desired positions with respect to the rods 66 and the other digit fixation modules. After each digit fixation module is properly aligned and secured using the adjustment mechanisms as described above in detail, the assembly of the modular digit fixation device (such as device 1 or 80) is complete.

After the modular digit fixation device (such as device 10 or 80) is assembled, the device sits away from the weight bearing surface such that the device is less likely to interfere with patient mobility and to prevent complications resulting from use of the weight bearing surface with the device attached to the patient's toes. Additionally, the adjustment mechanisms face outward to enable access by the surgeon during the recovery period. Because the adjustment mechanisms are accessible post-operatively, the surgeon may make modifications to the alignments as necessary over time.

As discussed above, for the sake of simplicity, the device embodiment depicted herein is intended for use with the right foot. However, it is understood that a substantially similar device is contemplated for use with the left foot. Further, there may also be embodiments for use with other digit extremities or bones.

Figure 5A:
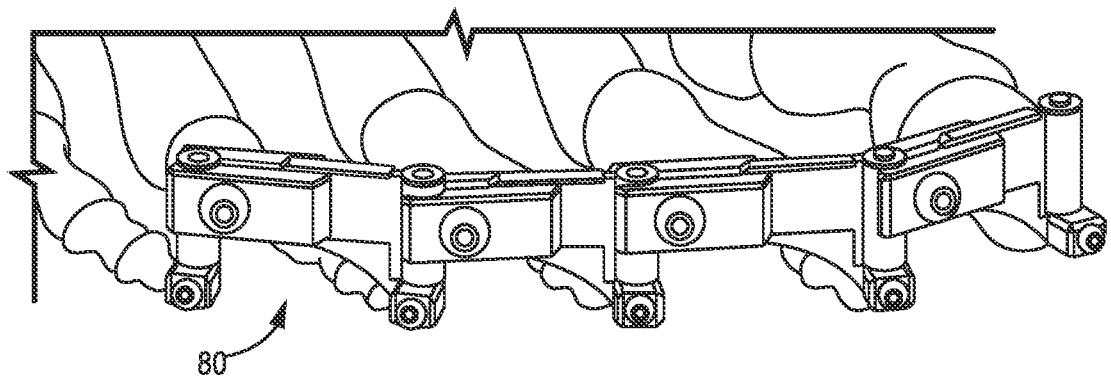
FIG. 5A is a close-up front perspective view of a modular digital fixation system attached to a patient's toes, according to one embodiment.
Figure 5B:
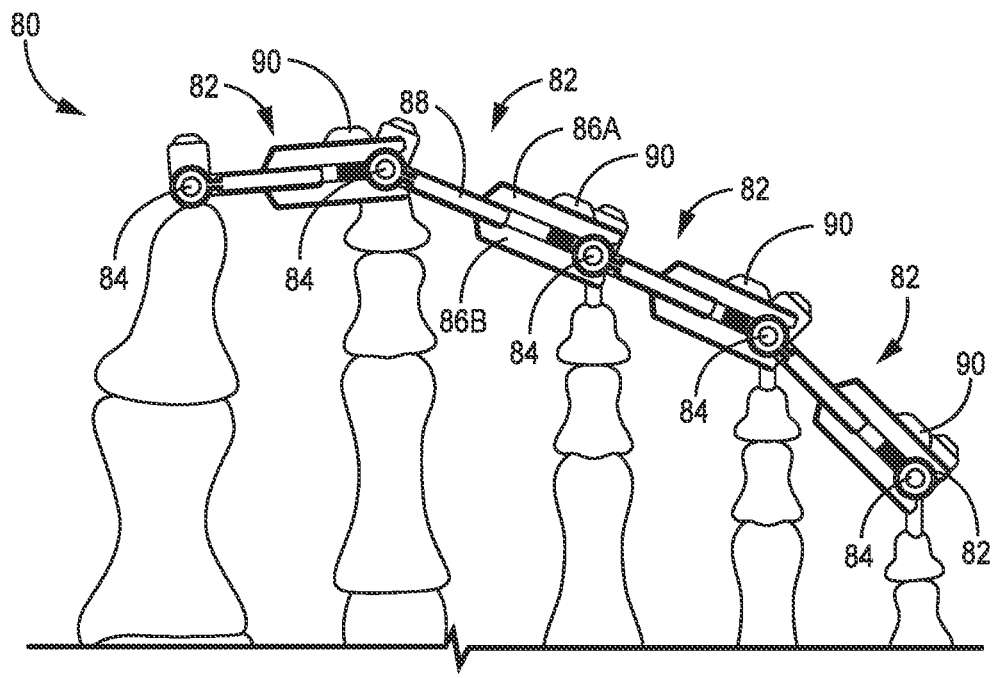
FIG. 5B is a top view of the system of FIG. 5A, according to one embodiment.

FIGS. 5A-5D depict alternate views of another embodiment of a modular digit fixation device 80 in use on the right foot. More specifically, FIG. 5A depicts a front view of the modular digit fixation device 80, while FIG. 5B depicts the device 80 viewed from above. FIG. 5B more clearly shows how the digit fixation modules 82 are attached to the rods 84. That is, FIG. 5B depicts the rod 84 disposed in the lumen (not shown) of each digit fixation module 82. Additionally, FIG. 5B depicts the clamp 86 of the module 82, and more specifically the disposition of the front clamp component 86A and back clamp component 86B on the module 82. The adjustment mechanism 90 extends between and through the front clamp 86A and back clamp 86B such that the two components of the clamp 86 are operably coupled. The clamp 86 is also disposed about the flange 88 such that the front clamp 86A and back clamp 86B slide, as a pair moving in unison, along the flange 88.

FIG. 5B, according to one implementation, also exemplifies the different orientations in which the digit fixation modules 82 may be arranged. For example, FIG. 5B shows the clamps 86 fixed at various distances along the flanges 88 and the different angles at which the cylinders of the modules 82 can be fixed to the rod 84. The various angles and distances in which the digit fixation modules 82 are fixed can ensure proper alignment of the digits post-operatively.

Figure 5C:
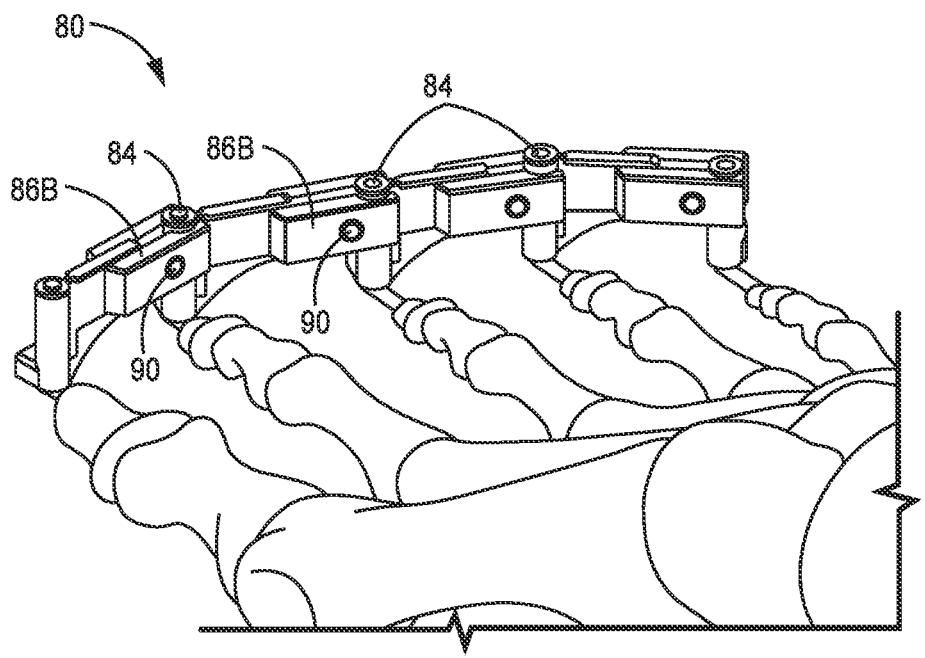
FIG. 5C is a rear perspective view of the system of FIG. 5A, according to one embodiment.

FIG. 5C depicts a rear view of the digit fixation device 80. This view best shows the interaction of the adjustment mechanism 90 with the back clamp 86B. FIG. 5C also depicts different lengths at which the joint of the rod 84 can be disposed in relation to the distal tip of the toe. According to certain embodiments, the joint of the rod 84 is positioned at some distance from the tip of the toe such that neither the rod 84 nor the module 82 contacts the skin at the tip of the toe. Further, given the varying lengths of the toes of a patient's foot, the joint of any given rod 84 of any given toe can be positioned at some distance from the front the toe as necessary to ensure proper alignment of the digit fixation modules 82. More specifically, for a toe that is substantially shorter than the adjacent toe, the joint of the rod 84 of that shorter toe is disposed at a greater distance from the tip of that toe in relation to the joint of the rod 84 of the adjacent, longer toe to ensure that the modules 82 of each can be coupled together without too great an angle therebetween.

Figure 5D:
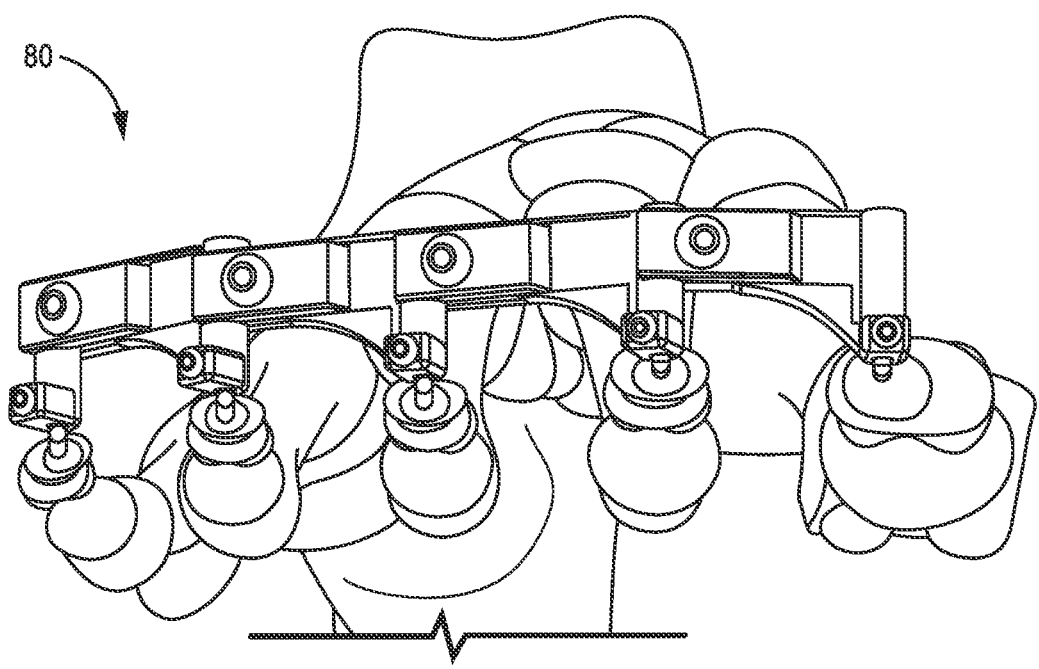
FIG. 5D is another front perspective view of FIG. 5A from a lower angle, according to one embodiment.

FIG. 5D further depicts the modular digit fixation device 80 from a slightly lowered front perspective. FIG. 5D demonstrates how the digit fixation modules 80 can be arranged at different heights on the rods 84 and with respect to one another. That is, each of the rods 84 can extend out of the tip of its respective toe at a different height and/or location in comparison to any other rods 84, thereby resulting in each rod 84 potentially differing in height in comparison to adjacent rods 84. Given this expected variation, and the need that the modules 82 be coupled to each other at substantially similar heights, it is understood that each module 82 can potentially be attached to the rod 84 at a different height in comparison to the height at which adjacent modules 82 are attached to adjacent rods 84.

Although the present invention has been described with reference to preferred embodiments, persons skilled in the art will recognize that changes may be made in form and detail without departing from the spirit and scope of the invention.

What is claimed is:

1. A modular digit fixation system, comprising:
  (a) at least one first digit fixation module comprising:
    (i) a modular body comprising:
      (A) a flange;
      (B) a first cylinder comprising a first lumen sized to receive a first intramedullary fixation rod implantable in a first digit bone of a patient; and
    (C) a first coupling mechanism configured to selectively lock the first cylinder at a desired position along the first intramedullary fixation rod; and
    (ii) a clamp slidably coupled to the flange; and
  (b) a second digit fixation module comprising:
    (i) a second cylinder comprising a second lumen sized to receive a second intramedullary fixation rod implantable in a second digit bone of the patient; and
    (ii) a second coupling mechanism configured to selectively lock the second cylinder at a desired position along the second intramedullary fixation rod.

2. The modular digit fixation system of claim 1, wherein the clamp is attachable to the second cylinder.

3. The modular digit fixation system of claim 1, wherein the flange comprises a channel defined therein, wherein the clamp is slidable along the channel.

4. The module digit fixation system of claim 1, wherein each of the first and second intramedullary fixation rods comprises:
  (a) a first length; and
  (b) a second length having an axis disposed at an angle ranging from about 90 degrees to about 180 degrees in relation to an axis of the first length,
  wherein the first length and the second length are attached at a joint.

5. The module digit fixation system of claim 1, further comprising
  a first attachment mechanism operably coupled to the clamp.

6. A modular digit fixation system, comprising:
  (a) at least two intramedullary fixation rods, wherein each of the at least two intramedullary rods is implantable into an elongate bone of a patient;
  (b) at least one first digit fixation module comprising:
    (i) a modular body comprising:
      (A) a flange; and
      (B) a first cylinder comprising a first lumen defined therein, wherein a first of the at least two intramedullary fixation rods is positionable within the first lumen;
    (ii) a clamp slidably coupled to the flange such that the clamp is slidable along a length of the flange, the clamp comprising:
      (A) a first clamp arm;
      (B) a second clamp arm; and
      (C) a clamp lumen defined by the first and second clamp arms; and
  (c) a second digit fixation module comprising a second cylinder comprising a second lumen defined therein, wherein a second of the at least two intramedullary fixation rods is positionable within the second lumen.

7. The modular digit fixation system of claim 6, wherein the first cylinder is adjustably positionable along a length of the first of the at least two intramedullary fixation rods and the second cylinder is adjustably positionable along a length of the second of the at least two intramedullary fixation rods.

8. The modular digit fixation system of claim 7, wherein the first and second cylinders are adjustably positionable along a sagittal plane of the patient.

9. The modular digit fixation system of claim 6, wherein the clamp is attachable to the second cylinder such that a distance between the first cylinder and the second cylinder is adjustable along a transverse plane of the patient.

10. The modular digit fixation system of claim 9, wherein the second cylinder is positionable within the clamp lumen such that the clamp is attachable to the second cylinder.

11. The modular digit fixation system of claim 6, wherein the flange comprises a channel defined therein, wherein the clamp is slidable along the channel.

12. The module digit fixation system of claim 6, wherein each of the at least two fixation rods comprises:
   (a) a first length; and
   (b) a second length having an axis disposed at an angle ranging from about 90degrees to about 180 degrees in relation to an axis of the first length,
   wherein the first length and the second length are attached at a joint.

13. The module digit fixation system of claim 12, wherein the first length is implantable into a digit bone of the patient, and wherein the first cylinder is adjustably positionable along the second length of the first of the at least two intramedullary fixation rods and the second cylinder is adjustably positionable along the second length of the second of the at least two intramedullary fixation rods.

14. The module digit fixation system of claim 6, further comprising
   (a) a first coupling mechanism operably coupled to the first cylinder;
   (b) a first attachment mechanism operably coupled to the clamp; and
   (c) a second coupling mechanism operably coupled to the second cylinder.

15. A method for fixation of at least two digits, the method comprising:
   implanting a first intramedullary fixation rod into a first digit bone;
   implanting a second intramedullary fixation rod into a second digit bone;
   positioning a first digit fixation module over the first intramedullary fixation rod, the first digit fixation module comprising:
      (a) a modular body comprising:
         (i) a flange; and
         (ii) a first cylinder comprising a first lumen defined therein; and
      (b) a clamp slidably coupled to the flange such that the clamp is slidable along a length of the flange, the clamp comprising:
         (i) a first clamp arm;
         (ii) a second clamp arm; and
         (iii) a clamp lumen defined by the first and second clamp arms,
      wherein the positioning of the first digit fixation module over the first intramedullary fixation comprises positioning the first intramedullary fixation rod in the first lumen;
   positioning a second digit fixation module over the second intramedullary fixation rod, the second digit fixation module comprising a second cylinder comprising a second lumen defined therein, wherein the positioning of the second digit fixation module over the second intramedullary fixation comprises positioning the second intramedullary fixation rod in the second lumen; and
   attaching the first digit fixation module to the second digit fixation module via the clamp.

16. The method of claim 15, wherein the attaching the first digit fixation module to the second digit fixation module via the clamp comprising positioning the second cylinder within the clamp lumen.

17. The method of claim 15, further comprising adjusting a position of the first and second digit fixation modules along a sagittal plane of the patient by adjusting the position of the first and second digit fixation modules along a length of the first and second intramedullary fixation rods.

18. The method of claim 15, further comprising adjusting a distance between the first and second cylinders along a transverse plane of the patient by adjusting the position of the clamp along the length of the flange.

* * * * *